No. 854,234. PATENTED MAY 21, 1907.
E. L. PERRY.
PACKING OR GASKET.
APPLICATION FILED JUNE 12, 1906.
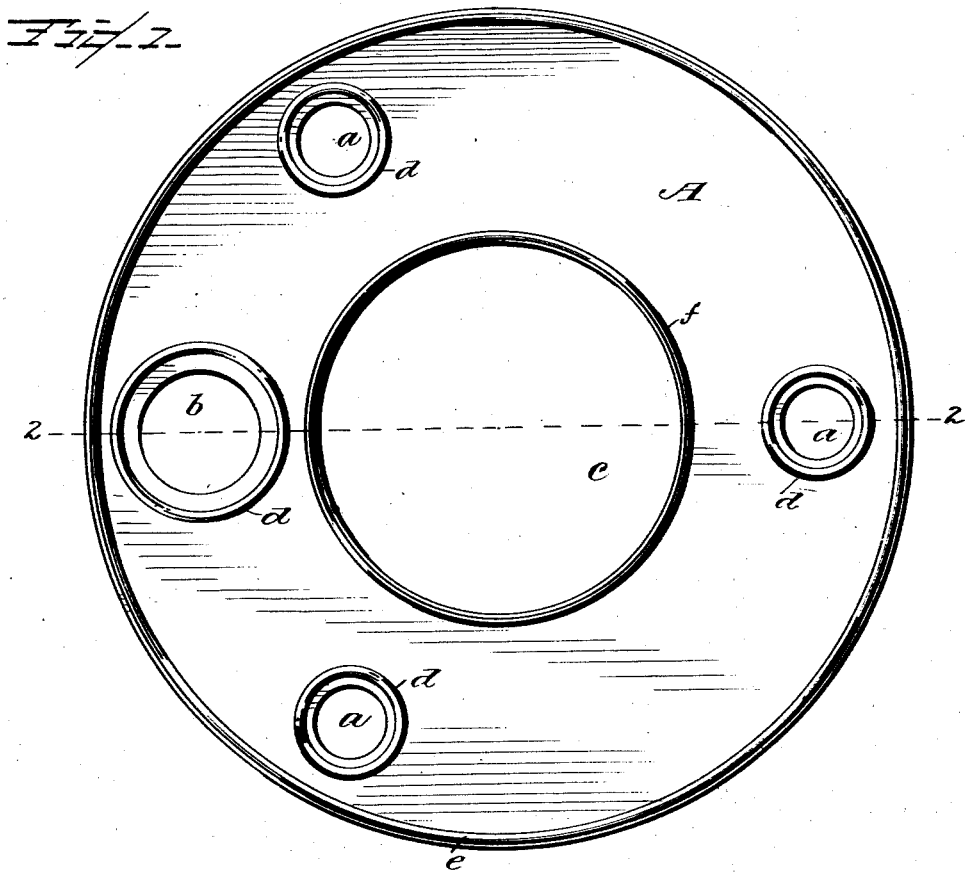
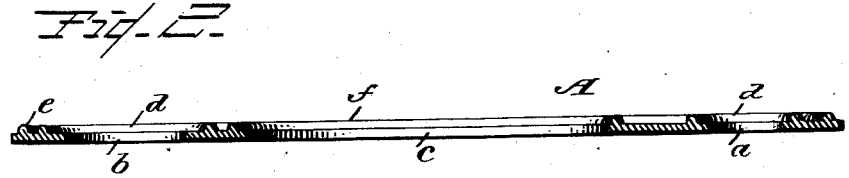
Witnesses
Geo. B. Williams.
M. E. Moore.
Inventor
Edward L. Perry.
By Chas. H. Frater
Attorney

UNITED STATES PATENT OFFICE.

EDWARD L. PERRY, OF PATERSON, NEW JERSEY.

PACKING OR GASKET.

No. 854,234.　　　　Specification of Letters Patent.　　　　Patented May 21, 1907.

Application filed June 12, 1906. Serial No. 321,421.

*To all whom it may concern:*

Be it known that I, EDWARD L. PERRY, a citizen of the United States, residing at Paterson, in the county of Passaic and State of New Jersey, have invented certain new and useful Improvements in Packing or Gaskets; and I do hereby declare that the following is a full, clear, and exact description of the same, reference being had to the annexed drawings, making a part of this specification, and to the letters and figures of reference marked thereon.

The object of the present invention is to provide a ring, sheet, gasket or other like packing used in steam, oil, water, and other joints whereby a perfectly tight joint under a very light pressure is obtained, thereby enabling the user of said packing to remove the same from the joints and again use them on other joints thus creating a great saving where many joints are to be packed.

It has been the custom heretofore to screw the joint up so tight in order to obtain the desired result, that the packing would be pressed out of shape and could not be used in any other joint, and when a new joint was necessary to be made, the old packing was thrown away and a new one used to take its place.

It has been found that a raised ring or flange or bead taking the same line in a circle around the edge of each bolt hole will allow the metal flanges when brought together on the surface of the gasket or packing to form a tight joint under very light pressure without defacing or injuring in any way the face of the gasket or packing.

The invention consists of a gasket or other packing of compressible material constructed substantially as shown in the drawings and hereinafter described and claimed.

Figure 1 of the drawings is a plan view of a gasket or packing constructed in accordance with my invention. Fig. 2 a sectional elevation taken on line 2 2 of Fig. 1.

The accompanying drawings represent a gasket or other like packing formed of a suitable compressible, elastic, or flexible material having in the present instance the usual bolt-holes *a b* and the central opening *c*. Around the bolt-holes *a b* are round circular projections *d* which take the same line in a circle around said bolt-holes, and if desired a similar projection *e* may encircle the outer edge of the gasket or packing and also a projection *f* around the central opening *c*. These projections conforming to the circular bolt-holes around the same or taking the same line in a circle around the edge thereof will admit of the metal flanges when brought together on the surface of the gasket or packing to form a perfectly tight joint with comparatively little pressure.

Gaskets or packing of any suitable material may be used as the essential feature of the invention resides in the round circular projections around the bolt-holes without regard to the material from which the packing is formed.

Having now fully described my invention, what I claim as new and desire to secure by Letters Patent is:—

1. As an improved article of manufacture, a gasket or packing in a single integral element having bolt holes therein and a single projection encircling each hole, said projection taking the same line in a circle around the edge and at a distance from each hole.

2. As an improved article of manufacture, a gasket or packing in a single integral element having bolt holes therein and a single projection encircling each hole, said projection taking the same line in a circle around the edge and at a distance from each other, and a similar projection encircling the outer edge of the gasket or packing.

3. As an improved article of manufacture, a gasket or packing in a single integral element having bolt holes therein and a single projection encircling each hole, said projection taking the same line in a circle around the edge and at a distance from each hole, said projections being rounded.

In testimony whereof I affix my signature in presence of two witnesses.

EDWARD L. PERRY.

Witnesses:
　SAMUEL P. VOUGHT,
　EDGAR M. TILT.